United States Patent

Nakata et al.

[11] Patent Number: 6,121,529
[45] Date of Patent: Sep. 19, 2000

[54] INFORMATION INPUT APPARATUS FOR MUSIC COMPOSITION AND RELATED APPLICATIONS

[75] Inventors: Takuya Nakata; Kenichiro Saito; Kazuhito Mishima; Hirotsugu Kamiya; Yoshihisa Ito; Hiroyuki Iwase, all of Hamamatsu, Japan

[73] Assignee: Yamaha Corporation, Hamamatsu, Japan

[21] Appl. No.: 08/980,726

[22] Filed: Dec. 1, 1997

Related U.S. Application Data

[63] Continuation of application No. 08/365,508, Dec. 28, 1994, abandoned.

[30] Foreign Application Priority Data

Dec. 28, 1993 [JP] Japan ...................................... 5-353287

[51] Int. Cl.[7] ............................ G09B 15/00; G09B 15/02
[52] U.S. Cl. .................... 84/477 R; 84/470 R; 84/483.2
[58] Field of Search .................................. 84/477 R, 473, 84/483.1, 483.2, 482, 484, 470 R, 601, 423 R; D17/24

[56] References Cited

U.S. PATENT DOCUMENTS

| | | | |
|---|---|---|---|
| D. 373,137 | 8/1996 | Nakada | D17/24 |
| 4,350,070 | 9/1982 | Bahu | 84/1.03 |
| 4,412,473 | 11/1983 | Laflamme | 84/485 R |
| 4,538,501 | 9/1985 | Smith et al. | 84/478 |
| 5,153,829 | 10/1992 | Furuya et al. | 364/419 |
| 5,184,830 | 2/1993 | Okada et al. | 273/433 |
| 5,355,762 | 10/1994 | Tabata | 84/609 |
| 5,400,687 | 3/1995 | Ishii | 84/477 R |
| 5,524,522 | 6/1996 | Hesnan | 84/473 |
| 5,665,927 | 9/1997 | Taki et al. | 84/609 |

FOREIGN PATENT DOCUMENTS

| | | |
|---|---|---|
| 2536561 | 5/1984 | France . |
| 3629420 | 3/1997 | Germany . |

*Primary Examiner*—Bentsu Ro
*Assistant Examiner*—Marlon T. Fletcher
*Attorney, Agent, or Firm*—Morrison & Foerster

[57] ABSTRACT

An information input apparatus comprises a casing which is held by an operator by opposite end portions thereof. At least one selection operating element is arranged on the front surface of the casing at a location close to one end thereof for selecting a kind of data to be input. At least one value-input operating element is arranged in the front surface of the casing at a location close to another end thereof, for inputting a value of the kind of data selected by the selection operating element. The value of the selected kind of data input is stored. The selection operating element is inclined relative to an edge of the one end of the casing, and the value-input operating element is inclined relative to an edge of the another end of the casing. The apparatus is compact and provides efficient inputting of information such as performance data for an electronic musical instrument.

12 Claims, 7 Drawing Sheets

INFORMATION INPUT APPARATUS FOR MUSIC COMPOSITION AND RELATED APPLICATIONS

This application is a Continuation of Application Ser. No. 08/365,508, filed Dec. 28, 1994, now abandoned.

BACKGROUND OF THE INVENTION

1. Field of the Invention

This invention relates to an information input apparatus which is suitable for use in an electronic musical instrument, and more particularly to an information input apparatus of this kind which is small in size and affords efficient information inputting.

2. Prior Art

In general, an operating element, such as a keyboard, is used for inputting non-electronic performance data, such as a musical score and a musical piece composed by an operator, to an electronic musical instrument. However, skill is required to operate the key board or the like as desired, which makes it difficult for unskilled operators to input the performance data in an efficient manner. To overcome this inconvenience, the present assignee has proposed by Japanese Utility Model Publication (Kokoku) No. 4-10637 an apparatus which displays a staff or stave and a cursor on a display, the cursor being moved as desired by operating a mouse or the like to insert desired notes at desired locations, thereby inputting performance data to an electronic musical instrument.

On the other hand, with recent progress of integrated circuit technology, components of an electronic musical instrument, such as a tone generator and a memory device, have become markedly reduced in size while requiring far less consumption of electric power for operation. Therefore, it is now possible to design an electronic musical instrument which is compact in size enough to use as a portable type, insofar as it is only required to store performance data and generate musical tones based on the stored performance data by the musical instrument. However, to design an electronic musical instrument which also has a function of inputting performance data, it is still difficult to reduce the size of the electronic musical instrument. That is, if a keyboard is used as means for inputting performance data, the total size of the instrument necessarily increases due to the use of the keyboard which has a fairly large size in general. Further, if a mouse, which is small in size itself, is used as means for inputting performance data, it requires a large flat area for operation thereon, making it almost impracticable to use the whole electronic musical instrument as a portable type.

Further, to input performance data, a display is required to monitor contents of performance data having been input, and hence it is also necessary to reduce the size of the display.

SUMMARY OF THE INVENTION

It is the object of the invention to provide an information input apparatus which is small in size and enables even an unskilled operator to input data in an efficient and accurate manner.

To attain the above object, in a first aspect of the invention, there is provided an information input apparatus that comprises: a casing having at least opposite end portions, the casing being held by an operator by the opposite end portions in his hands. At least one selection operating element is arranged on the front surface of the casing at a location close to the one end, for selecting a kind of data to be input. At least one value-input operating element is arranged in the front surface of the casing at a location close to the other end, for inputting a value of the kind of data selected by the selection operating element. A stores the value of the selected kind of data input by the value input operating element.

According to the first aspect of the invention, when the operator holds the casing of the information input apparatus in his hands, his thumbs are positioned on the front surface in the vicinity of the one end and the other end of the casing. Therefore, it is possible to operate the at least one selection operating element and the at least one value-input operating element with his thumbs. The kind of data to be input can be selected by the selection operating element and a value of the selected kind of data can be input by the input-value operating element, which makes it possible for the operator to input values of various kinds of data without largely changing the positions of the palms of his hands.

The selection operating element and the value-input operating element may be inclined relative to the one end surface and the other end surface of the opposite end portions. The operator is hardly required to move the palms of his hands in operating them, if the casing is held such that tips of his thumbs can be moved along paths passing these elements, which enables even more efficient data inputting;

Input and output terminals for connection with external devices may be arranged solely on a surface of the casing which forms the top surface remote from the operator when the casing is held. wirings connecting the apparatus to the external devices does not form obstacles to the operation of the apparatus.

At least one slide-type operating element may be arranged one or more ends of the casing. The operator is not required to move his thumbs if the slide-type operating element is operated by fingers other than his thumbs.

Preferably, the information input apparatus includes a display for displaying a plurality of kinds of data and a cursor. The selection operating element is operated to move the cursor to select a kind of data which is identical to a kind of data displayed at a position of the cursor, as the kind of data to be input.

The above and other objects, features, and advantages of the invention will become more apparent from the following detailed description taken in conjunction with the accompanying drawings.

BRIEF DESCRIPTION OF THE DRAWINGS

FIG. 5C is a flowchart showing a subroutine which is executed by the CPU when a LOCATION switch is on;

FIG. 5E is a flowchart showing a subroutine which is executed by the CPU when other switches are on;

DETAILED DESCRIPTION

Now, the invention will be described in detail with reference to the drawings showing an embodiment thereof.

A. Construction of the embodiment

A-1: Electrical construction of the embodiment

Figure 1:
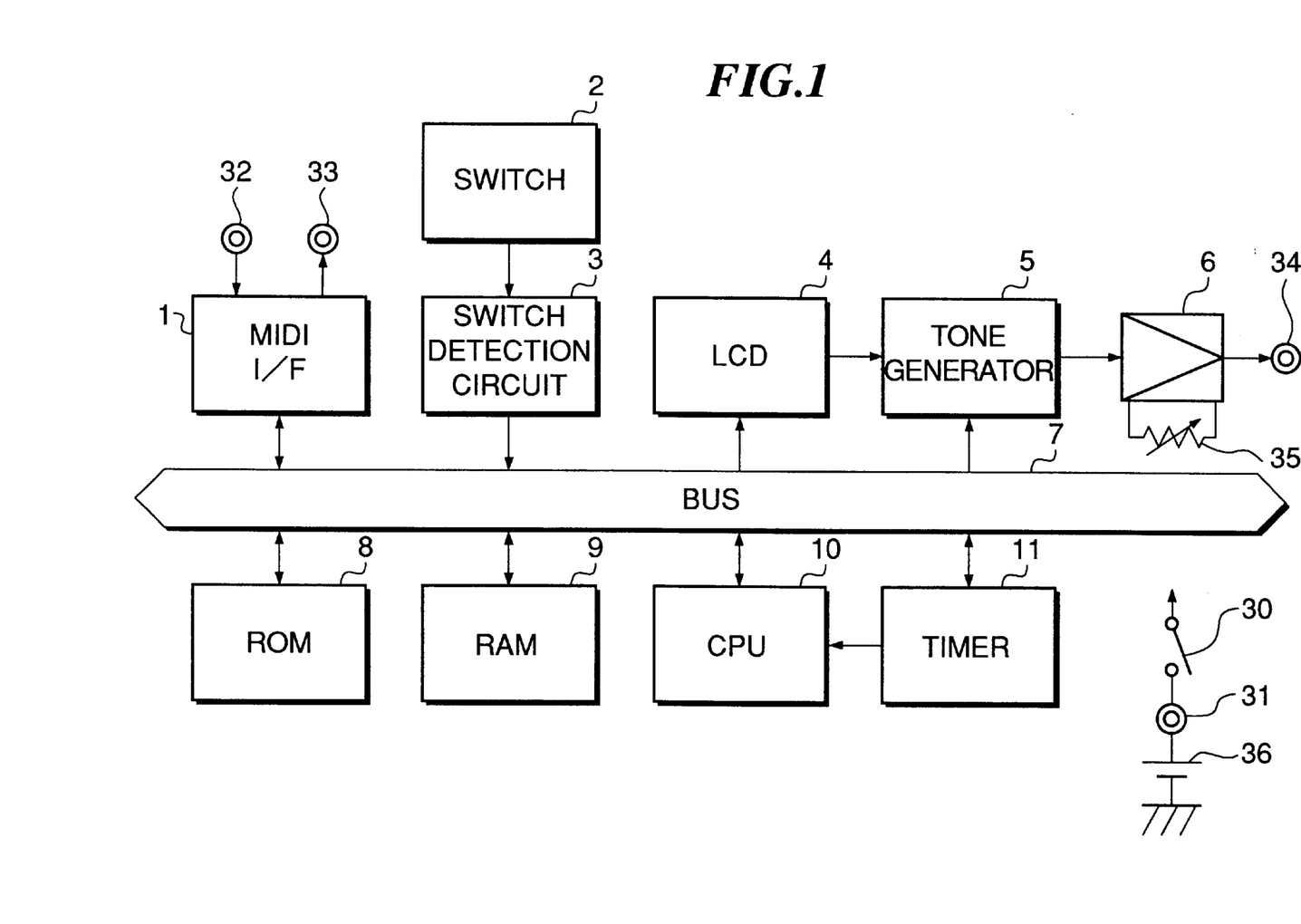
FIG. 1 is a block diagram showing the whole arrangement of an information input apparatus according to an embodiment of the invention.

Referring first to FIG. 1, there is shown the whole arrangement of an electronic musical instrument, particularly an electrical aspect thereof, incorporating an information input apparatus according to the invention.

In the figure, reference numeral 1 designates a MIDI (Musical Instrument Digital Interface) device which receives an external MIDI signal via a MIDI-IN terminal 32 to input performance data based on the MIDI signal through a bus 7. When the MIDI device 1 receives performance data via the bus 7, it converts the performance data into a MIDI signal and delivers the same via a MIDI-OUT terminal 33 to the outside of the instrument. Reference numeral 2 designates switches for operation by an operator, the operated states thereof being detected by a switch detection circuit 3, which delivers signals indicative of the detected states via the bus 7. Reference numeral 4 designates a liquid crystal display (LCD) which displays information received via the bus 7. Reference numeral 5 designates a tone generator, which synthesizes a tone signal based on performance data received via the bus 7 and delivers the tone signal via an amplifier 6 and a headphone terminal 34. The gain of the amplifier 6 can be adjusted as desired by a volume slider 35.

Reference numeral 10 designates a CPU, which controls operations of component parts and elements of the instrument according to a control program stored in a ROM (Read Only Memory) 8. Reference numeral 9 designates a RAM (Random Access Memory), from and into which data are read and written by the CPU 10. Reference numeral 11 designates a timer, which supplies time information to the CPU 10. Reference numeral 36 designates a battery, which supplies power supply voltage to electric circuits including those described above via a power supply terminal 31 and a power switch 30. In this connection, when a predetermined power supply plug is inserted into the power supply terminal 31, external power supply voltage is supplied to the electric circuits of the instrument via the predetermined power supply plug.

A-2: Mechanical construction of the embodiment

1) Overall construction

Next, the mechanical construction of the electronic musical instrument will be described with reference to FIG. 2A to FIG. 2E.

Figures 2A, 2B, 2C:
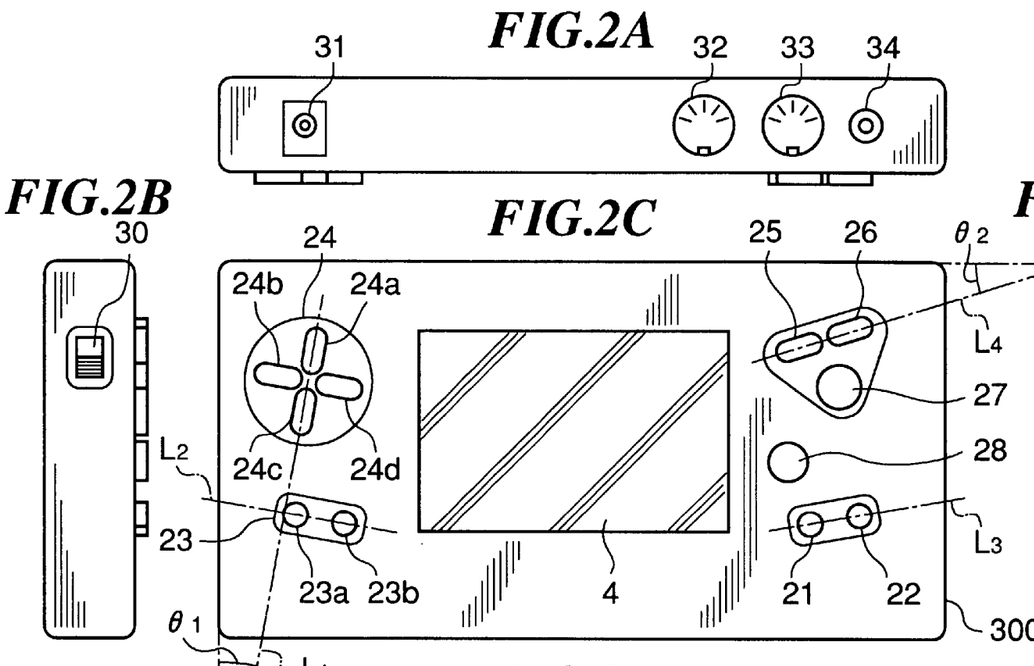
FIG. 2A is a plan view of the information input apparatus.
FIG. 2B is a left side view of the information input apparatus.
FIG. 2C is a front view of the information input apparatus.
Figure 2D:
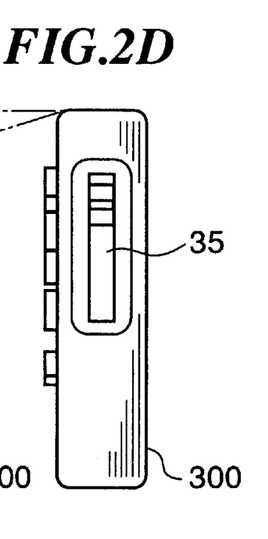
FIG. 2D is a right side view of the information input.
Figure 2E:
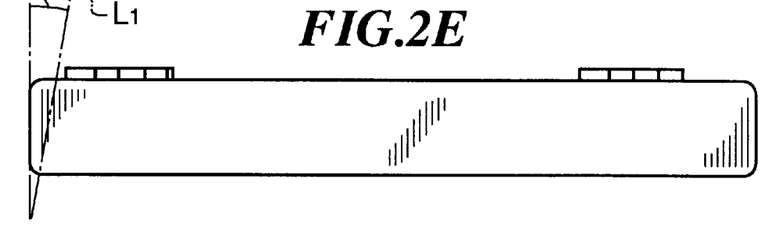
FIG. 2E is a bottom view of the information input apparatus.

As shown in FIG. 2A to FIG. 2E, the electronic musical instrument has a casing 300 substantially in the form of a rectangular parallelopiped, on a top surface of which are arranged the power supply terminal 31, the MIDI-IN terminal 32, the MIDI-OUT terminal 33, and the headphone terminal 34 (FIG. 2A). That is, all the terminals for connection with external devices are arranged on the top surface of the casing 300. Therefore, even when cables or the like are connected to these terminals, they do not interfere with operation of the instrument by the operator. Further, the power switch 30 is arranged on a left side surface of the instrument casing 300, as shown in FIG. 2B, and the volume slider 35 on a right side surface of the same, as shown in FIG. 2D. This makes it possible for the operator to operate the power switch 30 and the volume slider 35 by his forefingers while holding the electronic musical instrument by both end portions thereof in his hands.

Referring next to a front surface of the casing, the liquid crystal display 4, which is shown to have a rectangular shape, is provided at a middle portion of the front surface. Reference numeral 24 designates a CURSOR switch which is comprised of upper, left, lower, and right CURSOR switches (pushbutton switches) 24a, 24b, 24c, and 24d, each having an elliptic shape, arranged in a radial array at circumferentially equal intervals of 90°. The CURSOR switch 24 is arranged on the front surface of the casing 300 at a location close to a left end thereof. A straight line $L_1$ extending through the centers of the upper CURSOR switch 24a and the lower CURSOR switch 24c is inclined with respect to a left end edge of the casing 300 by an angle θ1 (approximately 15°). Further, reference numeral 23 designates a LOCATION switch, which is comprised of left and right LOCATION switches 23a and 23b, each in a circular shape. A straight line $L_2$ extending through the centers of the left and right LOCATION switches 23a and 23b intersects with the straight line $L_1$ at right angles.

Reference numerals 21 and 22 designate a head position switch and a playback/stop switch, respectively, each having a circular shape, arranged symmetrical to the left and right LOCATION switches 23a, 23b. Reference numerals 25 and 26 designate a DECREMENT switch and an INCREMENT switch, each having an elliptic shape. The DECREMENT and INCREMENT switches 25, 26 are arranged on the front surface of the casing 300 at a location close to a right end thereof. A straight line $L_4$ extending through the centers of these switches is inclined with respect to an upper end edge of the instrument by an angle θ2 (approximately 15°). Below the switches 25 and 26, there is arranged an ENTER switch 27 in a circular shape, and leftward below the ENTER switch 27, there is provided an UNDO switch 28 in a circular shape. It should be noted that the switch 2 appearing in FIG. 1 collectively represent the above switches 21 to 28, and the role and operation of each switch will be described hereinbelow.

When the operator holds the electronic musical instrument by the both end portions thereof in his hands, he can manipulate these switches 21 to 28 by his thumbs. Further, since the arrangement of these switches is inclined with respect to all the front surface side edges of the casing, it is possible for the operator to operate the switches almost without moving the palms of his hands, if he holds the instrument such that the tips of his thumbs can follow paths along these switches when his thumbs are angularly moved.

2) Details of construction of the liquid crystal display 4

Figure 3:
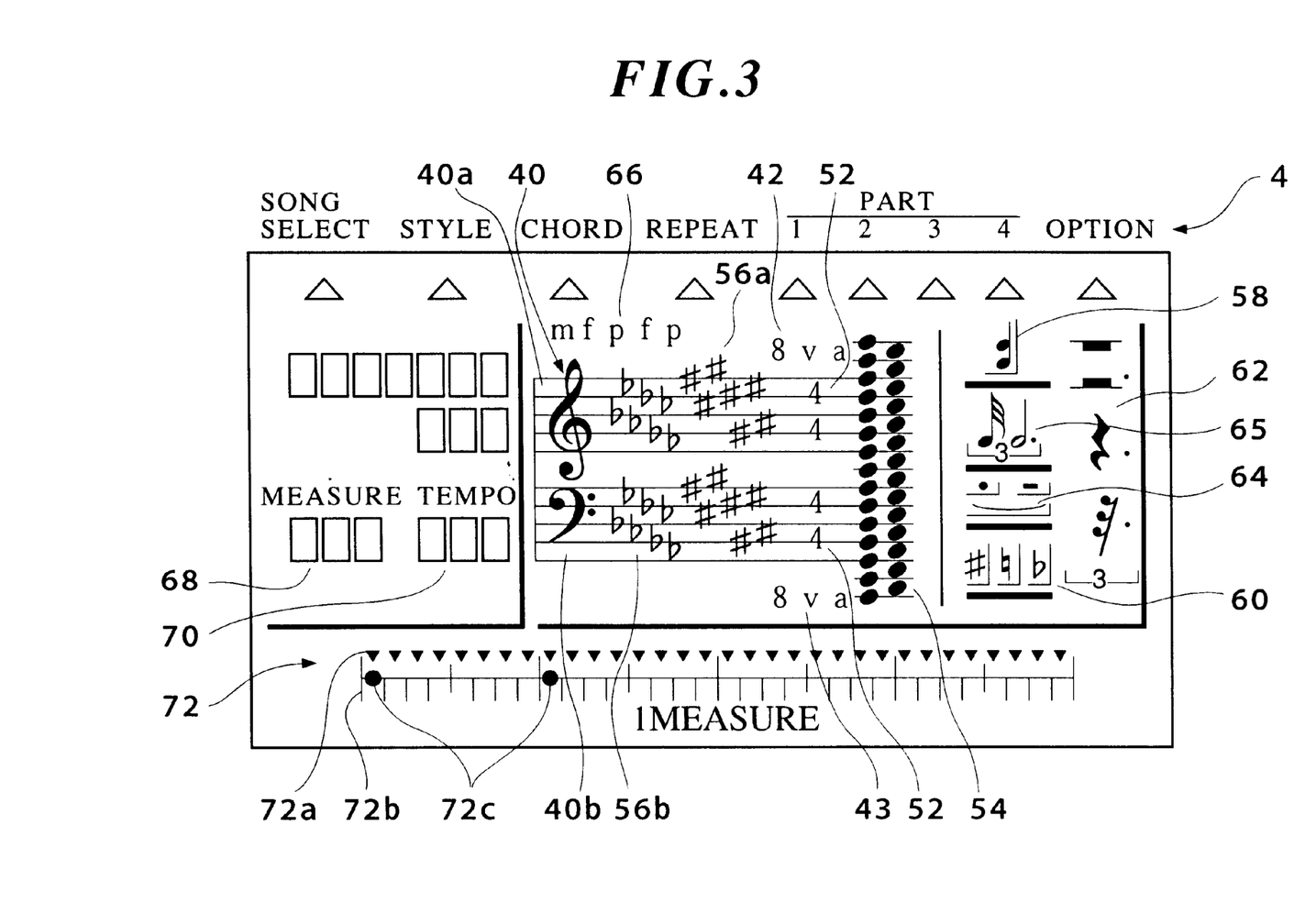
FIG. 3 is an enlarged view of a liquid crystal display appearing in FIG. 2C.

Next, the liquid crystal display 4 will be described in detail with reference to FIG. 3. In the figure, there is depicted a staff or stave 40 which is comprised of a treble stave 40a and a bass stave 40b at a central area of the liquid crystal display 4. At a central portion of each stave, there are arranged a large number of electrodes, each in the shape of an accidental mark of a sharp or a flat, forming key signature display areas 56A, and 56B, respectively. It should be noted that also other display areas referred to hereinbelow are formed by electrodes of the liquid crystal display 4, similarly to the key signature display areas 56a, 56b, respectively on which various kinds of information are displayed by selectively applying a predetermined voltage to the electrodes under the control of the CPU 10. Hereafter, throughout the specification, the operation of applying the voltage to each electrode is referred to as "light the electrode".

Beat display areas are provided rightward of the key signature display areas 56a, 56b, respectively. Further provided rightward of the beat display areas is a pitch display area 54 formed of electrodes, each having an elliptical shape, arranged on lines and interlined spaces of the stave 40. As illustrated in the figure, the pitch display area 54 is capable of displaying a pitch within a range of "a lower second line of the bass stave" to "an upper second line of the treble stave". Further, octave display areas 42 and 43 formed of electrodes, each depicting "8va", are arranged above and below, respectively, the beat display areas respectively. Further, above the stave 40, a dynamic mark display area 66 is formed by electrodes forming a character line of five characters of "m f p f p".

Figure 4A:
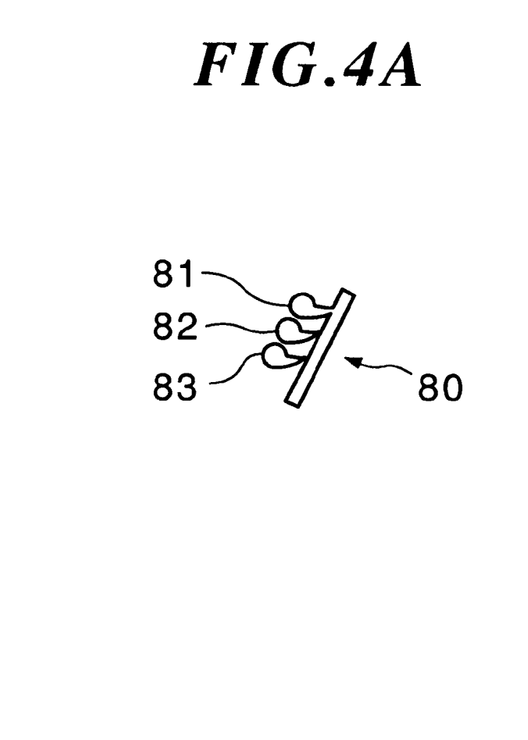
FIG. 4A is a diagram which is useful in explaining how a display of a rest is changed.

Next, at a right end of the liquid crystal display 4, there are arranged electrodes depicting symbols for a whole rest, a half rest, a quarter rest, and a thirty-second rest, from the top to the bottom, forming a rest display area 62. Details of electrodes depicting the thirty-second rest are shown in FIG. 4A. In FIG. 4A, an electrode 80 is formed of a component electrode 81 forming a symbol for a rest stem and a highest rest symbol head, a component electrode 82 forming a symbol for a second-highest rest head, and a component electrode 83 forming a symbol for a lowest rest head, the component electrodes 81, 82, and 83 being electrically insulated from each other. Therefore, when the component electrode 81 alone is lighted, the eighth rest is displayed, when the component electrodes 81 and 82 are lighted, the sixteenth rest is displayed, and when all the component electrodes 81, 82, and 83 are lighted, the thirty-second rest is displayed.

Figure 4B:
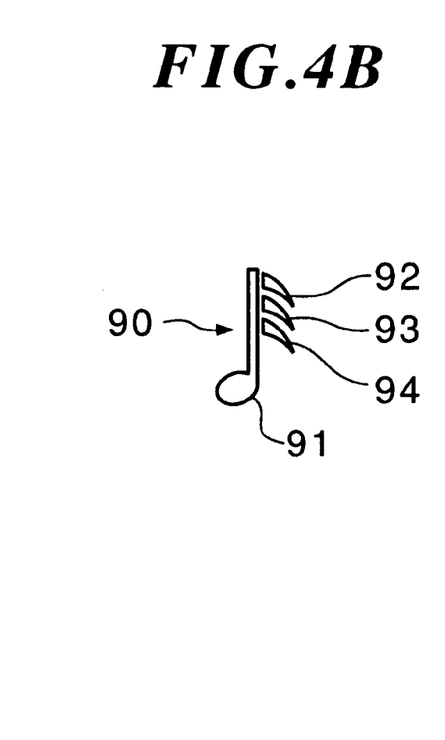
FIG. 4B is a diagram which is useful in explaining how a display of a note is changed.

Further, at the top of a column of symbols adjacent the rest display area 62, there is provided a chord display area 58 formed of electrodes depicting a symbol for a chord. Below the chord display area 58, there is provided a tone duration display area 65 formed of electrodes depicting symbols for a thirty-second note, a half note, a dot, and a triplet. Details of the electrodes depicting the thirty-second note and the half note will be described with reference to FIG. 4B and FIG. 4C. In FIG. 4B, an electrode 90 is comprised of a component electrode 91 forming a symbol for a note head and a note stem, and component electrodes 92, 93, and 94 forming respective tails of a note.

Figure 4C:
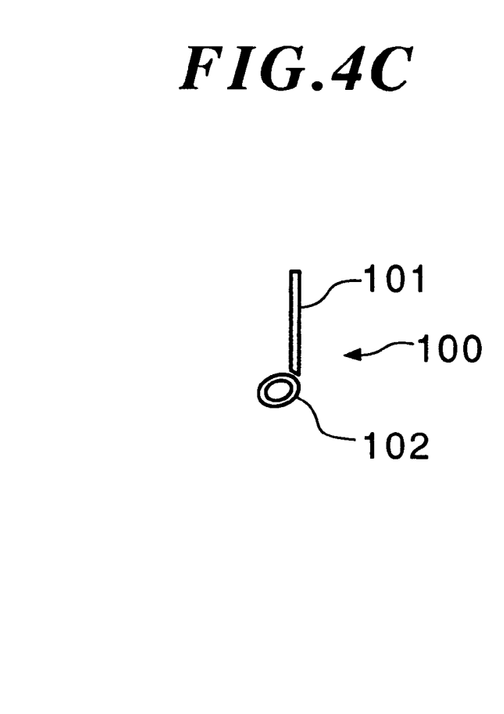
FIG. 4C is a diagram which is useful in explaining how a display of another note is changed.

Therefore, when the component electrode 91 alone is lighted, the quarter note is displayed, and as the component electrodes 92, 93, and 94 are additionally lighted in the mentioned order, there is displayed one of the eighth note, the sixteenth note, and the thirty-second note. Similarly, as shown in FIG. 4C, an electrode 100 is comprised of a component electrode 101 forming a symbol for a note stem, and a component electrode 102 forming a symbol for a note head. Therefore, when both the electrodes are lighted, the half note is displayed, and when the component electrode 102 alone is lighted, the whole note is displayed. A performance style display area 64 is provided below the tone duration display area 65. Below the performance style display area 64, there is provided an accidental note display area 60 formed of electrodes depicting symbols for a sharp, a natural, and a flat, respectively. Further, provided leftward of the stave 40 is a tempo display area 70 for displaying numerical values of three digits which denote the tempo of performance by the number of quarter notes per minute.

Next, reference numeral 68 designates a measure number display area. If a number (hereinafter referred to as "measure number" in the ascending order is allotted to each measure from the start of a song (piece of music), it is possible to specify a measure to be referred to by the measure number display area 68. Further, below the stave 40, there is provided a location display area 72 which is comprised of a scale display area 72b for displaying a straight line provided with scale marks dividing the straight line into "thirty-two" equal parts, "thirty-two" present position-indicating electrodes each having a shape of an inverted triangle, and marking electrodes each having a circular shape, which are located on the straight line of the scale area 72b and opposed to corresponding ones of the present state display electrodes 72a. In the illustrated example, however, only two marking electrodes 72c are shown. Assuming that the scale mark 72b shows the length of a single measure, desired timing can be specified within the measure by lighting one of the present position-indicating electrodes 72a.

Thus, by means of the key signature display areas 56a, 56b, the dynamic mark display area 66, the tempo display area 70, etc., information common to a song is displayed. Further, by means of the pitch display area 54, the tone duration display area 65, the performance style display area 64, etc. information peculiar to each tone, such as pitch, duration of the note, and performance style is displayed. Therefore, if desired timing within the song is specified, it is possible to specify a note, a rest, etc. related to the specified timing by the use of these display areas. Further, such timing can be displayed by the measure number display area 68 and the location display area 72.

In an ordinary musical score in general, notes, etc. are entered on a stave, and the notes specify both the pitch and duration of each tone. In the present embodiment, however, the pitch display area 54 specifies the pitch of a tone, and the tone duration display area 65 etc. specify the duration of the tone. The reason for employing such a construction is as follows: If the pitch and duration of a tone are to be specified by one note, it is required to provide a very large number of electrodes on the liquid crystal display 4, while overlapping of these electrodes is inevitable, which makes it almost impossible to realize the arrangement. Therefore, in the present embodiment, the pitch of a tone and the duration of the same are separately displayed, thereby simplifying the arrangement of the liquid crystal display 4 while enabling various kinds of notes to be displayed thereon.

B. Operation of the embodiment

B-1: Overall operation

Figure 5A:
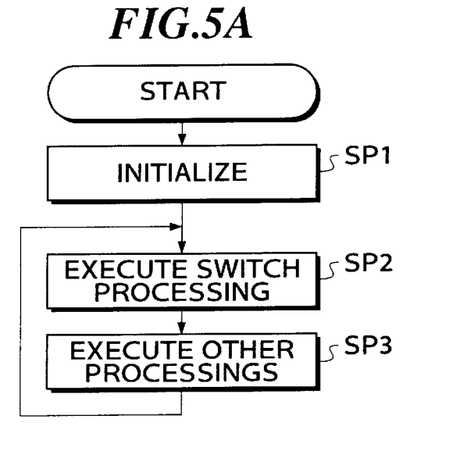
FIG. 5A is a flowchart showing a main routine which is executed by a CPU of the FIG. 1 automatic performance.

Next, the operation of the present embodiment will be described. First, when the power switch 30 is turned on, a main routine shown in FIG. 5A is started. In FIG. 5A, the processing starts with a predetermined initialization carried out at a step SP1. On this occasion, a flickering cursor appears on a predetermined position of the liquid crystal display 4. Next, the program proceeds to a step SP2, wherein the states of the switches 2 are detected by the switch-detecting circuit 3, and based on results of the detection, various kinds of processing, referred to hereinafter, are carried out. Then, the program proceeds to a step SP3, wherein tone-generating processing and other kinds of processings are carried out. Thereafter, the steps SP2 and SP3 are repeatedly carried out. Details of the processing at the step SP2 will be described separately with respect to each possible case.

B-2: Processing executed when the CURSOR switch 24 is on

Figure 5B:
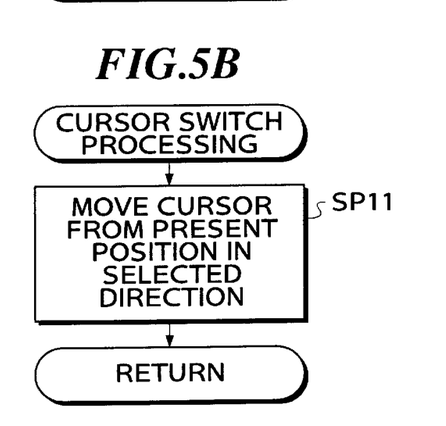
FIG. 5B is a flowchart showing a subroutine which is executed by the CPU when a CURSOR switch is depressed.

When the CURSOR switch 24 is depressed, a subroutine shown in FIG. 5B is started, wherein at a step SP11, the position of the cursor is shifted. More specifically, when one of the upper, left, lower, and right cursors 24a, 24b, 24c, and 24d appearing in FIG. 2C is depressed, the cursor is moved in a direction corresponding to the depressed cursor. For example, if the left cursor 24b is continuously depressed when the cursor is positioned at the rest display area 62 appearing in FIG. 3, the cursor is moved therefrom sequentially e.g. to the chord display area 58, the pitch display area 54, one of the beat display areas and so forth.

B-3: Processing executed when the LOCATION switch 23 is on

Figure 5C:
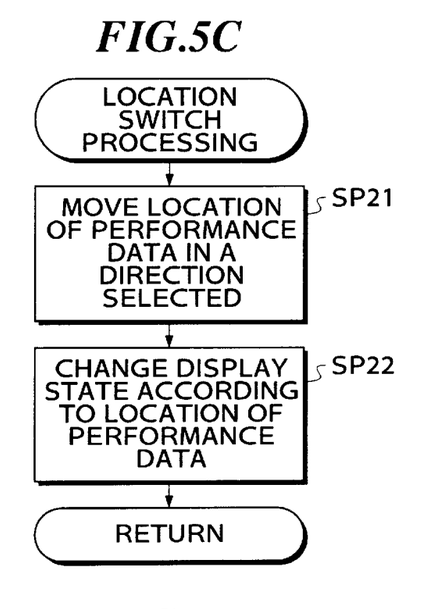

When the LOCATION switch 23 is on, a subroutine shown in FIG. 5C is started, wherein at a step SP21, the location or address of performance data within the RAM 9 is shifted in a direction indicated by the switch 23. Here, the "location" corresponds to a location in the song, at which performance data is referred to or set. The location can be designated by a unit shift amount corresponding to the duration of a thirty-second note. For example, if the left LOCATION switch 23a is on, the location is shifted toward the start of the song by an amount corresponding to the duration of a thirty-second note, while if the right LOCATION switch 23b is on, the location is shifted toward the end of the song by the same amount.

Then, the program proceeds to a step SP22, wherein the display state of the location display area 72 and that of the measure number display area 68 are changed according to the updated location of performance data. That is, when the location is shifted leftward i.e. toward the start of the song, the present position-indicating electrode 72a having been lighted thus far is extinguished, and one adjacent thereto on the left is lighted. Further, if the location is shifted leftward when the present position-indicating electrode 72a at the left end of the display area 72 is on, this electrode is extinguished, and the present position-indicating electrode 72a at the right end of the area 72 is lighted, and a value displayed at the measure number display area 68 is decremented by "1". In contrast, when the location is shifted to the right, i.e. toward the end of the song, display operation is performed in a manner opposite to the above. That is, when the location is shifted, the present position-indicating electrode 72a currently lighted is extinguished, and at the same time, the electrode 72a adjacent thereto on the right is lighted, while a value displayed on the measure number display area 68 is incremented, if necessary.

Further, at the step SP22, when event data indicating a note and/or the like exists at a shifted or updated location, contents thereof are displayed at corresponding display areas described above within the liquid crystal display 4. For example, when data of a note is present at this location, corresponding electrodes of the pitch display area 54 and the tone duration display area 65 are lighted, and if necessary, electrodes of the chord display area 58, the performance style display area 64 or the accidental note display area 60 are lighted.

On the other hand, when none of a note, a rest, and the like is present at the shifted or updated location, there is no display made at any of the pitch display area 54, the tone duration display area 65, the rest display area 62, etc. Here, whether or not there is any note or rest at each location is known from lighted ones of the marking electrodes. In the example illustrated in FIG. 3, only ones of the marking electrodes which are currently lighted, are shown in the figure. That is, in this example, the leftmost electrode 72c and the ninth marking electrode 72c from the left end are lighted, which indicates that there is some note or rest at each of the corresponding locations.

B-4. Processing executed when the DECREMENT switch 25 or the INCREMENT switch 26 is depressed.

Figure 6:
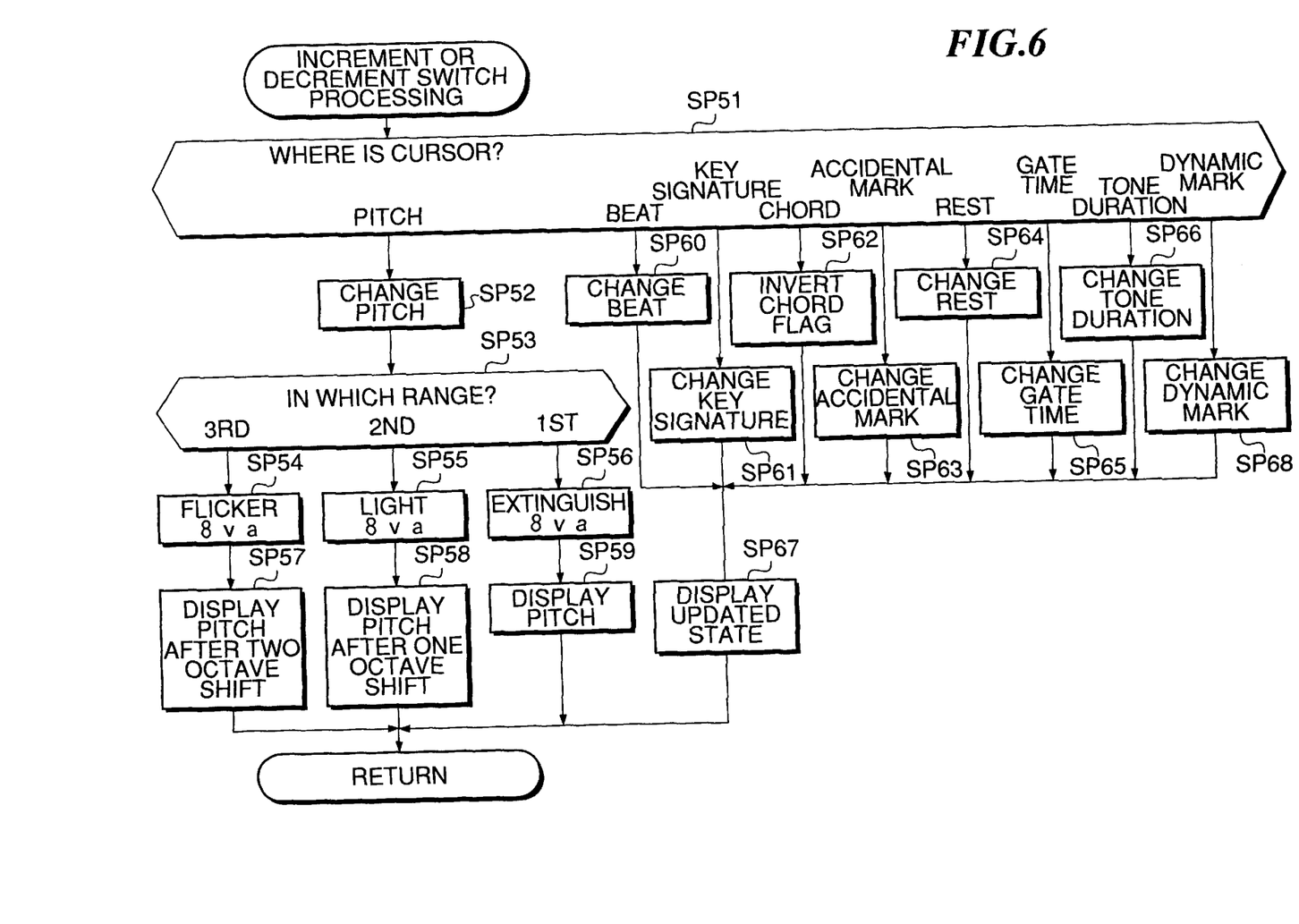
FIG. 6 is a flowchart showing a subroutine which is executed by the CPU when a DECREMENT switch or an INCREMENT switch is depressed.

When either the DECREMENT switch 25 or the INCREMENT switch 26 is depressed, a subroutine shown in FIG. 6 is started. First, it is determined at a step SP51 at which of the display areas of the liquid crystal display 4 the cursor is currently flickering. Depending on results of this determination, one of the branches of the processing is executed thereafter. After completion of the branch processing, the program returns to the FIG. 5A main routine. Details of each of the branch processings, which is executed in correspondence to the current position of cursor, will be described.

(1) Pitch changing processing

When the cursor is positioned at the pitch display area 54, the program proceeds from the step SP 51 to a step SP52, wherein the pitch of a tone determined by performance data located at the present location and corresponding to the position of the cursor is changed. That is, when the DECREMENT switch 25 is depressed, the pitch is lowered by "2nd" degree, while when the INCREMENT switch 26 is depressed, the pitch is raised by "2nd" degree.

Then, the program proceeds to a step SP53, wherein it is determined to which of a "first range" to a "third range" the updated pitch belongs. The "first range" means a range which can be directly displayed by the pitch display area 54, i.e. the range from the second lower line of the bass stave 40b to the second upper line of the treble stave 40a. Further, the "second range" means an upper one-octave-wide range extending over one octave from the highest pitch of the treble stave in a pitch-increasing direction, and a lower one-octave-wide range extending over one octave from the lowest pitch of the bass stave in a pitch-decreasing direction. Further, the "third range" means an upper one-octave-wide range extending over one octave from the highest pitch of the second range in a pitch-increasing direction, and a lower one-octave-wide range extending over one octave from the lowest pitch of the second range in a pitch-decreasing direction.

Further, when the performance data existing at the current location includes data for a chord, the range of the pitch is determined based on the following standards:

(i) When any of component tones of the chord belongs to "the third range", it should be determined that the chord belongs to "the third range".

(ii) When none of the components belong to "the third range", but any of them belongs to "the second range", it should be determined that the chord belongs to "the second range".

(iii) When all the component tones belong to "the first range", it should be determined that the chord belongs to "the first range".

If it is determined that the pitch of the performance data belongs to "the first range", the program proceeds to a step SP56, wherein the octave display areas 42, 43 are extinguished. Then, the program proceeds from the step SP56 to a step SP59, wherein the updated pitch is displayed at the pitch display area 54 without lighting the octave display area 42 or 43, and the position of the cursor is changed following the change in the pitch.

On the other hand, if it is determined at the step SP53 that the pitch belongs to "the second range", the program proceeds to a step SP55, wherein one of the octave display areas 42 and 43 is lighted. That is, when the pitch belongs to the upper one-octave range of "the second range", the octave display area 42 is lighted, while when the pitch belongs to the lower one-octave range of "the second range", the octave display area 43 is lighted. Then, the program proceeds to a step SP58, wherein results of this change of the pitch by one octave are displayed at the pitch display area 54. That is, when the pitch belongs to the upper one-octave range of "the second range", the position of a lighted electrode in the pitch display area 54 is shifted in the pitch-lowering direction by one octave, whereas when the pitch belongs to the lower one-octave range of "the second range", the position of the lighted electrode in the pitch display area 54 is shifted in the pitch-raising direction by one octave. Accordingly, the position of the cursor is changed following this change of display of the pitch.

If it is determined at the step SP53 that the pitch belongs to "the third range", the program proceeds to a step SP54, wherein one of the octave display areas 42 and 43 is set to a flickering state. Next, the program proceeds to a step SP57, wherein results of this change of the pitch by two octaves are displayed at the pitch display area 54, and accordingly the position of the cursor is changed. Further, the selection of the octave display area to be made to flicker and the direction of change of the pitch are determined in the same manner as above.

By the way, according to the musical grammar, to designate a note shifted by one octave on the score, it is a rule to enter "8va" on the music paper, and the operations executed at the steps SP55 and SP58 are based on this rule. To designate a note shifted by two octaves, however, it is required according to the musical grammar to enter "15ma" on the musical paper. In other words, the above method of making the display of "8va" flicker to express the shift of a pitch by two octaves is original or unique to the present embodiment. The reason for employing the method is as follows: If characters of "15ma" are to be displayed at the liquid crystal display 4, it is necessary to provide electrodes corresponding to these characters, which results in an increased size as well as in an increased manufacturing cost of the liquid crystal display 4. On the other hand, in a piece of music of an ordinary kind, it is a very rare case that the pitch of a tone belongs to "the third range", and hence it is considered that the above method of expressing a shift of two octaves will not cause a large inconvenience.

Now, specific examples of the above described operation will be described with reference to FIG. 7A. In the pitch display area 54, a chord formed of two tones is displayed in an example depicted on the left end of the figure. In this example, the higher tone belongs to "the first range", while the lower tone belongs to "the third range", and therefore it is determined that the pitch belongs to the "third range", and then the steps SP54 and SP57 are executed, to carry out a display as shown in the figure. More specifically, the octave display area 43 is made to flicker, and at the pitch display area 54, the pitch shifted to the lower side by two octaves is displayed.

In this state, if the operator continues to depress the INCREMENT switch 26 with the cursor position being set to the lower tone, the steps SP52 to SP59 are carried out, partially repeatedly. That is, if the pitch of the lower tone is raised by "2nd" degree by execution of the step SP52, the resulting pitch belongs to "the second range", and hence at the step SP55, the octave display area 43 is lighted. Then, by execution of the step SP58, each pitch of the tones of the chord is displayed in the state shifted by one octave. Further, following this change in the pitch, the cursor position is changed.

Figure 7A:
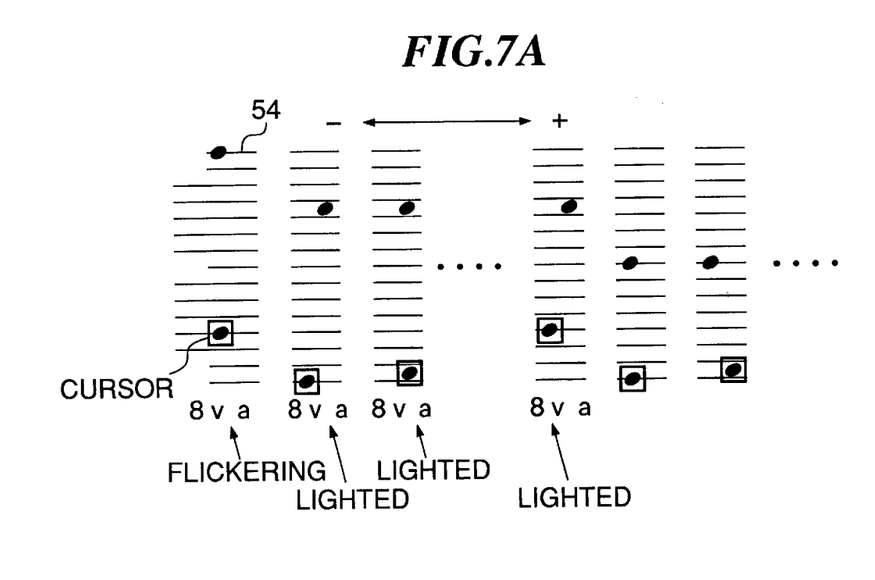
FIG. 7A is a diagram which is useful in explaining how the pitch of a tone is changed.

If the INCREMENT switch 26 further continues to be depressed, the state of display of the pitch display area 54 and that of display of the octave display area 43 are changed in the left-to-right order of examples shown in FIG. 7A. That is, the pitch of the lower tone gradually rises until both the pitches fall within "the first range", whereupon the octave display area 43 is extinguished, and the pitches of tones are displayed without the pitch being shifted by any octave. Inversely, if the DECREMENT switch 25 continues to be depressed, the state of display of the pitch display area 54 and that of display of the octave display area 43 are changed in the right-to-left order of examples shown in FIG. 7A.

2) Tone duration changing processing

Figure 7B:
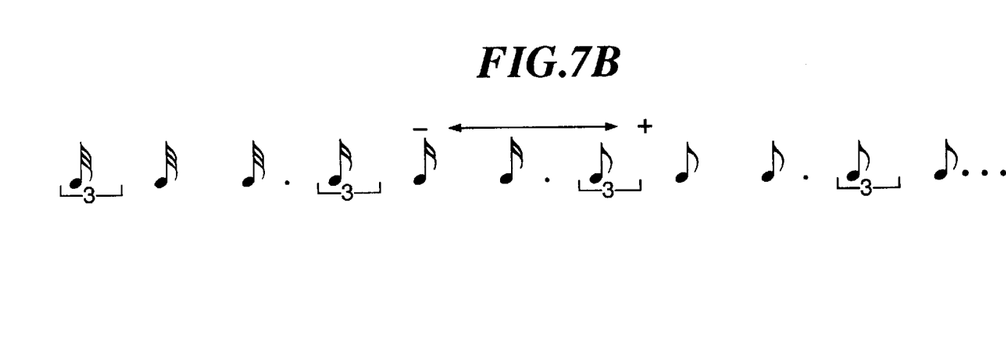
FIG. 7B is a diagram which is useful in explaining how the duration of a note is changed.

When the cursor is positioned at the tone duration display area 65, the program proceeds from the step SP51 to a step SP66, wherein the tone duration at the present location is changed according to the changed tone duration, and then the program proceeds to a step SP67, wherein the display state of the tone duration display area 65 is changed. That is, the display state of the tone duration display area 65 is changed such that the displayed electrode is changed rightward in examples illustrated in FIG. 7B so long as the INCREMENT switch 26 is depressed. On the other hand, the same is changed such that the displayed electrode is changed leftward in the examples illustrated in FIG. 7B so long as the DECREMENT switch 25 is depressed.

3) Rest changing processing

When the cursor is positioned at the rest display area 62, the program proceeds from the step SP51 to a step SP64, wherein the duration of a rest input at the present location is changed. Then, the program proceeds to the following step SP67, wherein the display symbol for the rest is changed based on the changed duration of the rest. That is, so long as the INCREMENT switch 26 is depressed, the duration of the rest is elongated, and the display symbol for the rest is changed to a correspondingly longer one, while so long as the DECREMENT switch 25 is depressed, the duration of the rest is shortened, and the display symbol for the rest is changed to a correspondingly shorter one.

4) Gate changing processing

When the cursor is positioned at the performance style display area 64, the program proceeds from the step SP51 to a step SP65, wherein the gate time (time period from note on to note off) at the present location is changed. Here, the gate time can be designated as indicated in a right-hand column of Table 1 shown below. So long as the INCREMENT switch 26 is depressed, the designation of the gate time is sequentially changed in the order of (i) to (iv) listed in the right-hand column. On the other hand, when the DECREMENT switch 25 is depressed, the designation is sequentially changed in the reverse order.

Figure 7C:
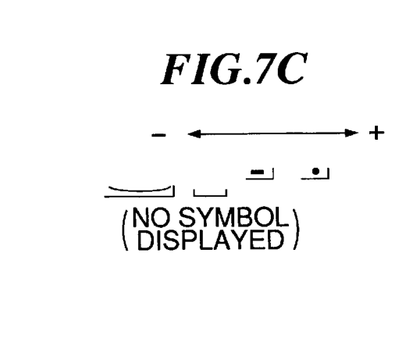
FIG. 7C is a diagram which is useful in explaining how gate time is changed.

Then, at the following step SP67, the display symbol of the performance style display area 64 is changed to one corresponding to the update gate time. That is, a corresponding one of symbols is selected from a right-hand column of Table 1 and displayed. Therefore, when the INCREMENT switch 26 continues to be depressed, the display state of the performance style display area 64 is changed such that the display symbol is changed to a rightward one of examples illustrated in FIG. 7C, whereas when the DECREMENT switch 25 continues to be depressed, the display state of the performance style display area 64 is changed such that the display symbol is changed to a leftward one of the examples illustrated in FIG. 7C.

TABLE 1

|       | Designation of Gate Time | Symbol |
|-------|--------------------------|--------|
| (i)   | Set the gate time to a very long time (that is, the timing of note-off of a tone is prolonged to timing just before the timing of note-on of the next tone, such that there is no break between one tone and the next one, thereby generating a smooth sound). | Slur |
| (ii)  | Set the gate time to an ordinary time period. | (No symbol displayed) |
| (iii) | Set the gate time to a long time period. | Tenuto |
| (iv)  | Set the gate time to a short time period | Staccato |

5) Beat changing processing

When the cursor is positioned at one of the beat display areas 52, the program proceeds from the step SP51 to a step SP60, wherein the beat of the song under processing is changed. That is, so long as the INCREMENT switch 26 is depressed, the symbol is sequentially changed or set in the order of "2/4 time", "3/4 time", "4/4 time", and so forth. So long as the DECREMENT switch 25 is depressed, the beat is sequentially changed or set in the reverse order. Then, when the program proceeds to the step SP67, symbols for the updated beat are displayed at one beat display area 52.

6) Key signature processing

When the cursor is positioned at one of the key signature display areas 56a, 56b, the program proceeds from the step SP51 to a step SP61, wherein the key signature of the song under processing is changed. That is, so long as the INCREMENT switch 26 is depressed, the key signature is sequentially changed in the order of "C major", "G major", "D major", . . . , whereas so long as the DECREMENT switch 26 is depressed, the key signature is sequentially changed in the reverse order. When the program proceeds to the step SP67, a symbol or symbols each indicative of sharp and/or flat for the selected key signature is/are lighted or extinguished.

7) Chord processing

When the cursor is positioned at the chord display area 58, the program proceeds from the step SP51 to a step SP62, wherein a chord flag is inverted. "The chord flag" designates whether or not designation of a plurality of tones is permitted at one location. When this flag is equal to "1", the above designation is permitted, while if the same is equal to "0", the above designation is not permitted. Then, when the program proceeds to the step SP67, the display state of the chord display area 58 is changed according to the changed chord flag. That is, if the chord flag is equal to "1", the chord display area 58 is lighted, whereas if the chord flag is equal to "0", the chord display area 58 is extinguished.

8) Processing for accidental marks

When the cursor is positioned at the accidental mark display area 60, the program proceeds from the step SP51 to a step SP62, wherein an accidental mark for the tone at the present location is changed. More specifically, the pitch of the performance data is shifted by upward or leftward by a semitone. That is, so long as the INCREMENT switch 26 is depressed, the accidental mark is sequentially changed in the order of "no mark", "sharp", "flat", and "natural", whereas so long as the DECREMENT switch is depressed, the accidental switch is sequentially changed in the reverse order. Then, when the program proceeds to the step SP67, the updated accidental mark is displayed at the accidental mark display area 60.

9) Processing for dynamic marks

Figure 7D:
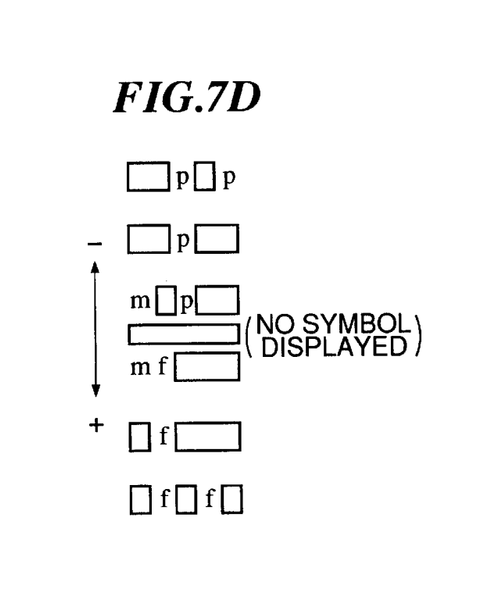
FIG. 7D is a diagram which is useful in explaining how a dynamic mark is changed.

When the cursor is positioned at the dynamic mark display area 66, the program proceeds from the step SP51 to a step SP68, wherein the dynamic mark at the present location is changed. More specifically, the velocity of the performance data is changed. That is, as shown in FIG. 7D, so long as the INCREMENT switch 26 is depressed, the dynamic mark is sequentially changed in the order of "pianissimo (pp)", "piano (p)", "mezzo-piano (mp)", . . . , whereas so long as the DECREMENT switch 25 is depressed, the dynamic mark is sequentially changed in the reverse order. Then, the program proceeds to the step SP67, wherein the updated dynamic mark is displayed at the dynamic mark display area 66.

Thus, when the DECREMENT switch or INCREMENT switch 25 or 26 is depressed, a different kind of processing is carried out, depending on the position of the cursor assumed at the time the switch 25 or 26 is depressed. Therefore, the operator has only to move the cursor to a desired position for a particular processing in advance, then shift the location to a particular one by the location switch 23, if the processing should be carried out at the particular location, and thereafter manipulate the switch 25 or 26 as desired.

B-5: Processing responsive to depression of ENTER switch 27

Figure 5D:
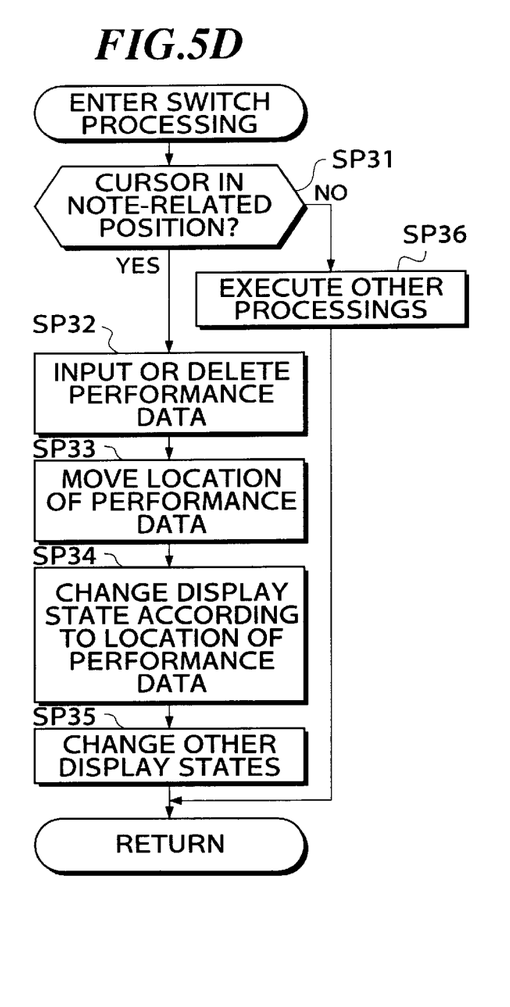
FIG. 5D is a flowchart showing a subroutine which is executed by the CPU when an ENTER switch is depressed.

When the ENTER switch 27 is depressed, a subroutine shown in FIG. 5D is started. In the FIG. 5D, first it is determined at a step SP31 whether or not the cursor is positioned at a position related to a note. The "position related to a note" means any of the pitch display area 54, the rest display area 62, and the tone duration display area 65. If the answer to the question of the step SP31 is negative (NO), the program proceeds to a step SP36, wherein other kinds of processing are carried out, followed by the program returning to the main routine.

On the other hand, if the answer to the question of the step SP31 is affirmative (YES), the program proceeds to a step SP32, wherein inputting or deletion of performance data is carried out. That is, if some performance data (event data) already exists at the present location, the existing performance data is deleted. In this connection, to prevent performance data which should not be deleted from being lost by an erroneous operation of the operator, the deleted performance data is once stored into a buffer, thereby permitting the same to be restored by a predetermined operation (e.g. by depressing an UNDO switch 28).

On the other hand, if no performance data exists at the present location, performance data corresponding to the cursor position is input. That is, if the cursor is positioned at the rest display area 62, duration data corresponding to the duration of the displayed rest is input, while if the cursor is positioned at the pitch display area 54 or at the tone duration display area 65, event data and duration data corresponding to the tone duration are input. In this connection, it is impossible to designate detailed information of event, duration, etc., such as "drive or ride" and "swing", which cannot be expressed on the score, merely by selected data of tone duration, rest duration, gate time, and so forth, and therefore only somewhat mechanical performance data can be input. However, these parameters may be subsequently changed as desired.

At the following step SP33, the location of the performance data is shifted. For example, if there are four quarter notes within one measure under "4/4 time", the locations of these quarter notes should be "first part, "ninth part" "17th part" and "25th part", respectively, in the order of the left to the right of the scale display area 72b of the location display area 72 appearing in FIG. 3. Therefore, once a quarter note has been input when the present location exists at the first part from the left, the present location is shifted to "the ninth part", and the next note should be entered at "the ninth part". However, if the aforementioned chord flag is equal to "1", a plurality of items of event data can be input at the same location, and then the present location is not shifted even if the note has been input.

Following the execution of the step SP33, the program proceeds to a step SP34, wherein the display state of the location display area 72 is changed based on the updated location. The program then proceeds to a step SP35, wherein other processings are carried out. Then, when the above processings are completed, the program returns to the main routine.

B-6: Processing in the case where other switches are on.

Figure 5E:
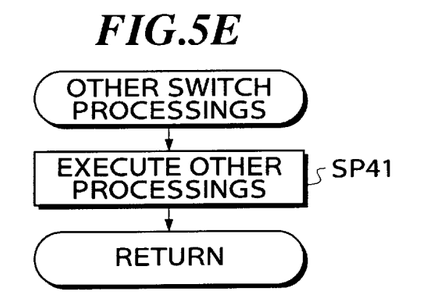

If an on-state of any other switch is detected at the step SP2 of the main routine, a subroutine shown in FIG. 5E is started for other kinds of processing. For example, when the head position switch 21 is depressed, at a step S41 in FIG. 5E, the location is shifted to the head position of the song under processing. Further, if the playback/stop switch 22 is depressed when the automatic performance is not carried out, the automatic performance is started, and when the playback/stop switch 22 is depressed again in the course of the play, the automatic performance is stopped.

C-6: Variations

The invention is by no means limited to the embodiment described above, but various modifications and variations, several of which are described below, can be made thereto.

1) Display means (liquid crystal display 4) is not necessarily required to be incorporated in the information input apparatus itself, but the information input apparatus can be connected to an external display device, such as CRT, whereby information input to the instrument can be displayed thereon.

2) Although in the above described embodiment, the switches 25 and 26 are used as "operating elements for data inputting", this is not limitative, but any other suitable means may be employed, such as a rotary encoder type, a slider type, a track ball type, etc. Further, although, in the above embodiment, the CURSOR switch 24 is used as "an operating element for selection", this is not limitative, but exclusive switches corresponding to respective kinds of information to be input may be used. Further, the "operating element for selection" is by no means limited to a switch, but may be implemented by any other suitable means. Further, when it is implemented by a slider, advantageously the slider may be arranged in an inclined fashion similarly to the switches of the embodiment.

3) The method of displaying an octave shift is not limited to lighting or extinguishing of the octave display areas 42, 43, but the octave shift may be directly displayed by the use of characters, such as "one octave shift", "two octave shift", or by changing the color of the display, the speed of flickering of the display, or by the use of another manner of the display.

4) It goes without saying that the information input apparatus of the present invention may be applied to a system other than the electronic musical instrument.

5) Although in the above described embodiment, the DECREMENT and INCREMENT switches 25 and 26 are used to designate the pitch and the tone duration, this is not limitative, but exclusive switches may be used to designate the pitch and the tone duration. This makes it possible to enter data even more efficiently, since it is necessary to frequently designate the pitch and the tone duration in actual operation of entering performance data.

What is claimed is:

1. An information input apparatus for inputting performance data, comprising:

a casing having at least opposite end portions including one end and another end, and a front surface, said casing being held by an operator by said opposite end portions in his hands;

at least one selection operating element arranged on said front surface of said casing at a location close to said one end, for selecting a kind of the performance data to be input;

at least one value-input operating element arranged in said front surface of said casing at a location close to said another end, for inputting a value of said kind of the performance data selected by said at least one selection operating element; memory means for storing said value of said selected kind of the performance data input by said at least one value input operating element; and display means arranged in said front surface of said casing at a location intermediate between said at least one selection operating element and said at least one value-input operating element, for displaying said kind of the performance data to be input and said value of said selected kind of the performance data stored by said memory means.

2. An information input apparatus according to claim 1, including at least one slide-type operating element arranged on at least one of said one end and said another end of said casing.

3. An information input apparatus according to claim 2, wherein said at least one slide-type operating element changes a value of a predetermined parameter of the performance data.

4. An information input apparatus according to claim 1, wherein said display means displays a plurality of kinds of the performance data and a cursor, and said at least one selection operating element is operated to move said cursor to select a kind of the performance data which is identical to a kind of performance data displayed at a position of said cursor, as said kind of the performance data to be input.

5. An information input apparatus according to claim 1, wherein said at least one selection operating element selects a kind of the performance data to be input, and said at least one value-input operating element inputs a value of said kind of the performance data selected by said at least one selection operating element.

6. An information input apparatus for inputting performance data, comprising:

a casing having at least opposite end portions including one end and another end, and a front surface, said casing being held by an operator by said opposite end portions in his hands;

at least one selection operating element arranged on said front surface of said casing at a location close to said one end, for selecting a kind of the performance data to be input;

at least one value-input operating element arranged in said front surface of said casing at a location close to said another end, for inputting a value of said kind of the performance data selected by said at least one selection operating element;

memory means for storing said value of said selected kind of the performance data input by said at least one value input operating element; and input and output terminals for connection with external devices, wherein said casing has a surface forming a top surface remote from said operator when said casing is held by said operator in his hands, said input and output terminals being arranged solely on said surface forming said top surface.

7. An information input apparatus according to claim 6, including at least one slide-type operating element arranged on at least one of said one end and said another end of said casing, for changing a value of a predetermined parameter of the performance data.

8. An information input apparatus according to claim 6, wherein said at least one selection operating element selects a kind of the performance data to be input, and said at least one value-input operating element inputs a value of said kind of the performance data selected by said at least one selection operating element.

9. An information input apparatus comprising:

stave display means for displaying a stave;

at least one display element;

performance data display means for displaying performance data input to said apparatus on said stave, and wherein when a value of pitch indicated by said performance data is within a range which can be displayed by said stave display means, said performance data display means extinguishes said at least one display element, and when said value of pitch indicated by said performance data is outside said range, said performance data display means properly shifts a position of display of said value of pitch in said stave, while lighting one of said at least one display element corresponding to a direction of said shifting of said position of display of said value of pitch if an amount of said shifting is within a predetermined value, and flickering said one of said at least one display element corresponding to said direction of said shifting of said position of display of said value of pitch if said amount of said shifting exceeds said predetermined value; and memory means for storing said performance data input to said apparatus.

10. An information input apparatus comprising:

stave display means for displaying a stave;

position-designating means for designating a position of progress of a piece of music having a plurality of measures, said position being one of a plurality of timing positions included in each of the plurality of measures;

position display means for displaying said position of progress of said piece of music designated by said position-designating means;

memory means for storing performance data input to said apparatus; and performance data display means for displaying pitch of said performance data corresponding to said position of progress of said piece of music designated by said position-designating means, on said stave displayed by said stave display means.

11. An information input apparatus according to claim 10, further comprising:

tone duration display means for displaying a selected one of a plurality of kinds of tone duration in an area other than said stave displayed by said stave display means; and supply means for supplying said performance data to said performance data display means and said tone duration display means;

wherein said performance data display means displays a plurality of pitch display elements, each indicative of a different pitch from the other pitch display elements, on said stave displayed by said stave display means.

12. An information input apparatus according to claim 10 in combination with a display.

* * * * *